United States Patent

Liehr et al.

[11] Patent Number: 5,432,254
[45] Date of Patent: * Jul. 11, 1995

[54] DISCONTINUOUS CATALYTIC PROCESS FOR THE PRODUCTION OF POLYAMIDE-6,6

[75] Inventors: Hartmut Liehr, Frankfurt am Main; Hans-Dieter Hofmann, Karben, both of Germany

[73] Assignee: Zimmer Aktiengesellschaft, Germany

[*] Notice: The portion of the term of this patent subsequent to Apr. 26, 2011 has been disclaimed.

[21] Appl. No.: 220,722

[22] Filed: Mar. 31, 1994

Related U.S. Application Data

[63] Continuation-in-part of Ser. No. 126,035, Sep. 23, 1993, Pat. No. 5,306,804.

[30] Foreign Application Priority Data

Apr. 26, 1993 [DE] Germany .......... 43 13 587.0
Feb. 4, 1994 [DE] Germany .......... 44 03 452.0

[51] Int. Cl.$^6$ .............................................. C08G 69/28
[52] U.S. Cl. ................................. 528/335; 528/324; 528/336
[58] Field of Search .................. 528/335, 324, 336

[56] References Cited

U.S. PATENT DOCUMENTS

| | | | |
|---|---|---|---|
| 2,163,636 | 6/1939 | Spanagel | 528/335 |
| 3,193,535 | 7/1965 | Carter | 528/335 |
| 3,407,179 | 10/1968 | Carr | 528/335 |
| 3,501,441 | 3/1970 | Brignac | 528/335 |
| 4,297,478 | 10/1981 | Rochina et al. | 528/336 |
| 4,540,772 | 9/1985 | Pipper et al. | 528/335 |
| 4,543,407 | 9/1985 | Curatolo et al. | 528/336 |
| 5,039,786 | 8/1991 | Pipper et al. | 528/324 |
| 5,051,491 | 9/1991 | Pipper et al. | 528/335 |
| 5,306,804 | 4/1994 | Liehr et al. | 528/335 |

OTHER PUBLICATIONS

Encyclopedia of Polymer Science & Engineering vol. 11, 4, 1988, "Peroxy Compounds to Polyesters", John Wiley & Sons, New York, p. 469.

*Primary Examiner*—Paul R. Michl
*Assistant Examiner*—P. Hampton-Hightower
*Attorney, Agent, or Firm*—Banner & Allegretti, Ltd.

[57] ABSTRACT

Discontinuous catalytic process for the production of polyamide-6,6 by heating an aqueous AH-salt solution containing $HPO_3^{2-}$-ions, precondensing the solution with evaporation of water at 7 to 10 bar pressure and polycondensing in the melt phase, whereby the heating rate above 175° C. of the AH-salt solution is at least in the range of 0.5° to 3.0° C./minute, the rate of evaporation of water is at least 2%/minute (based on the quantity of water in the AH salt solution). The total residence time for a polymer having a relative viscosity of 2.2 to 3.0 for heating from 175° C., precondensation and melt phase polycondensation, is not more than 90 minutes.

8 Claims, No Drawings

DISCONTINUOUS CATALYTIC PROCESS FOR THE PRODUCTION OF POLYAMIDE-6,6

BACKGROUND OF THE INVENTION

The invention is a continuation-in-part of Ser. No. 08/126,035 filed Sep. 23, 1993, now U.S. Pat. No. 5,306,804, issued Apr. 26, 1994.

The invention concerns a discontinuous catalytic process for the production of polyamide-6,6 comprising heating a catalyst-containing 75% to 85% aqueous solution of adipic acid-hexamethylene diamine salt while raising the pressure, precondensing with evaporation of the water at constant pressure and polycondensing at a temperature in the range of 260° to 290° C. while reducing pressure to atmospheric pressure.

PRIOR ART

In producing polyamide-6,6 from adipic acid-hexamethylene diamine salt (AH-salt) which has long been known, the following difficulties arise. In order to make the starting monomers ready for reaction and to keep the reaction mixture at a low viscosity, water must be added to the AH salt. The reaction pressure must be high enough that the added water remains in the liquid state at reaction temperature. However, water prevents the formation of high molecular polyamides, making it necessary to remove the water completely prior to polycondensation. In particular, the diamine component is volatile in steam. Extensive measures are therefore necessary to prevent pollution of the waste water and the air.

In addition to these difficulties the stoichiometric relationship is disturbed when a portion of the diamine component is carried away with the distilled water. This results in an interruption in the polycondensation reaction prior to the attainment of the desired high molecular weight. When these losses are offset by an initial surplus of diamine, trifunctional compounds, for example, ($\omega,\omega'$-diaminodihexylamine (=dihexamethylene triamine), are produced in greater amounts. These compounds act as cross-linking agents, and therefore, adversely affect the polymer quality, particularly resulting in increased filament breakage and formation of knots in the spinning and drawing of the polyamide.

The prior art, in order to counteract these difficulties, precondenses the 70% to 85% AH salt solution at pressures of at least 16 to 19 bar and an ending temperature of 265° to 280° C., whereby the residence time for heating and precondensing is in excess of 200 min. and an additional residence time of approximately 90 to 135 minutes is required for the subsequent polycondensation (U.S. Pat. No. 2,163,636, DE-B 1 570 283, EP-B 0 000 142). This high process pressure requires relatively expensive equipment. In addition, the high precondensation temperatures and the very long residence times result in significant aliamine losses and increased formation of triamines, with the attendant negative effects on the polyamide quality.

Another known method is to end the precondensation while retaining the high pressure at 240° to 245° C., in which case more than 100 minutes are necessary for the subsequent polycondensation. In this process (U.S. Pat. No. 3,407,179) the reactor walls are sprayed with AH salt solution, with the disadvantage that polyamide is contaminated by crosslinked polyamide from the prior batch. In the process of DE-A 2 117 623 which likewise operates at high pressure, volatile diamine is condensed on a dephlegmator spiral and returned into the reactor during heating and during the first ⅔ of the precondensation process. Nevertheless, 180 minutes plus heating time are necessary to achieve a polyamide solution viscosity of 2.23.

In continuously operated tube reactors process pressures of at maximum 10 bar are also known. The associated conditions of temperature and retention time, however, are not realizable in discontinuously operated autoclave vessels (EP-B 0 129 195 and 0 129 196).

None of these processes use or mention catalysts. The use of catalytic compounds is described only for alternative processes, like the condensation of hexamethylene aliamine with adipamide at initial pressures of, for example, 52 bar (U.S. Pat. No. 4,543,407) or the at least 28 h requiring condensation of solid AH-salt in the solid phase (EP-B 0455 066) or the post-condensation of polyamide-6,6 with an initial relative viscosity of at least 2.5 in an extruder (DE-C 3 605 202). For these processes, the quantities of catalysts used and remaining in the polyamide amount to more than 0.01 wt %, whereby the various phosphorus containing acids, their alkali salts and their organic esters show no differences of catalytic activity. However, such high concentrations of catalysts in polyamide-6,6 result in increased thermal degradation during storage, processing and use of the polyamide.

Therefore, there continues to be a need for a discontinuous process for the production of polyamide-6,6 which minimizes the residence time, the diamine losses and the formation of triamines, and employs lower pressure and therefore less expensive equipment than the processes known heretofore.

THE INVENTION

The object of this invention is to provide a discontinuous process for the production of thermal stable polyamide-6,6 from an aqueous adipic acid-hexamethylene diamine salt solution which will make possible both the minimization of diamine losses and of the formation of triamines and the utilization of low-cost equipment.

The new process begins with 75% to 85% aqueous solutions of adipic acid and hexamethylene diamine, with dicarboxylic acid and diamine present in essentially equivalent amounts as neutral salt (AH salt). The preparation of these solutions is accomplished by known methods. Small quantities of other monomers, such as caprolactam, up to approximately 3% by weight, can be added in order to modify the characteristics of the polyamide. The addition of usual chain regulators is possible.

To these aqueous AH-salt solutions a compound which forms $HPO_3^{2-}$-ions by dissociation, preferably phosphonic acid ($H_3PO_3$) or an alkali metal phosphonate ($Me_2HPO_3$), and more preferred disodium phosphonate ($Na_2HPO_3 \cdot 5 H_2O$) is added as a catalyst in a quantity corresponding to 0.001 to 0.008 wt %, preferably 0.002 to 0.005 wt % of phosphorus, based upon solid AH-salt. Surprisingly, in the present process $HPO_3^{2-}$-ions forming compounds are clearly superior to other phosphorus containing catalysts. Therefore, even with quantities of catalysts, which are lower than those used in the mentioned alternative processes, a substantial reduction of the residence time for precondensation and polycondensation is attained. As a result of this shorter residence time, the production costs as well as the diamine losses and the formation of triamines are reduced.

The thermal stability of the resulting polyamide equals that of polyamides produced without the use of catalysts.

The catalyst containing AH salt solution is first heated in a closed system under autogenous pressure with the exclusion of oxygen (less than 3 ppm $O_2$) and subsequently is precondensed while evaporating the water which was introduced with the solution and that which was generated during the reaction. In accordance with the invention, the solution is heated above 175° C. at a rate in the range of 0.5 to 3.0 ° C./min. until a pressure in the range of 7 to 10 bar is attained, preferably 8 to 9 bar, and more preferred approximately 8 bar. We found that this heating rate corresponds to a heating time which is favorable for reducing the hexamethylene diamine losses during the subsequent evaporation step, as well as for preventing the formation of triamines. The same heating rate is recommended between 165° and 175° C., whereas at temperatures below 165° C., the rate has no significant influence on the further process. Then the water (of the solution and of the condensation reaction) is distilled off, while retaining the pressure, at a rate of evaporation of at least 2%/minute, preferably at least 3%/min., the percent being based on the quantity of water in the AH salt solution.

After the water which was introduced with the AH salt solution and that which originated in the condensation reaction has been essentially distilled off, which occurs at a temperature of the reaction mass in the range of 235° to 260°, preferably 245° to 255° C., polycondensation is carried out in known manner in the melt phase by lowering the process pressure to 1 bar or less and simultaneously increasing the temperature a value in the range of 260° to 290° C. After a remarkably short polycondensation time, high molecular polyamide-6,6 is obtained. For polyamide-6,6 with a relative viscosity in the range of 2.2 to about 3.0, measured at 25° C. in a 1% polyamide solution in 96% sulfuric acid, the total residence time, comprising heating above 175° C. precondensation and polycondensation, amounts to not more than 90 minutes, and for a relative viscosity of about 3.0 to 3.5 to not more than 100 minutes.

The polyamide-6,6 which is discharged from the reactor and pelletized in the usual manner is well-suited for the production of fibers, films and molded articles. Known additives such as delustering substances, dyes and stabilizers can be added to the reaction mixture at any time.

If for special applications polyamide with a higher relative viscosity, for example 3.2 to 4.2, is required, after pelletizing the polyamide-6,6 can be further polycondensed in the solid state, as usual, at a temperature in the range of 165° to 190° C. under vacuum or in the presence of a current of an inactive gas, preferably nitrogen or carbon dioxide or a mixture thereof.

Surprisingly, we found that to realize a high volume-time yield, which primarily determines the cost effectiveness of the process, a high reaction rate in the precondensation due to high temperatures in combination with high pressure is less important than conditions which make it possible to quickly remove the water from the reaction system. These conditions are a low process pressure, a large heating surface and a large temperature difference between the heating medium and the product medium, i.e., a high rate of evaporation at low temperature. Under these conditions, due to the rapid increase of the concentration of the monomers in the reaction solution, it is possible to start early the precondensation and to achieve a high degree of reaction, while still maintaining the reaction mixture in a low-viscosity fluid state. The critical process phase during which free aliamine could escape is short. In addition, a high degree of conversion and consequently a low concentration of free hexamethylene aliamine, which is chemically bound in the molecule chains, is already reached at a temperature of about 190° C., above which the formation of dihexamethylene triamine is intensified. Therefore, the triamine content is minimized and amounts to a value below the limit of detection (100 ppm based on polyamide-6,6).

The reduced residence time compared to the state of the art makes possible a definite reduction of the process pressure and thus a reduction in the cost of the equipment without significant increase in aliamine losses. The aliamine losses are directly proportional to the residence time and inversely proportional to the process pressure. The theoretically higher aliamine losses at low process pressure are offset by the reduced residence time, provided that the residence time of the reaction mixture in the heating phase (above 175° C.) is adequate. The heating and evaporation rates in accordance with the invention make it possible to keep the reaction mixture in discontinuously operated autoclaves in a fluid molten state without having to set the process pressure at a minimum of 16 bar, as previously assumed.

A further reduction of the residence time, particularly of the polycondensation step, is achieved by the addition of small amounts of $HPO_3^{2-}$-ions forming compounds. This, as well as the low precondensation temperatures, result in a remarkable low concentration of thermal degradation products, especially carbonyl and imino compounds, which compulsorily occur at the high temperatures required for polycondensation. The UV-transmission of a 2 wt % polyamide solution in distilled formic acid, measured at a wavelength of 287 nm in a 5 cm-cell, is representative of these degradation products and of microgels (resulting of the crosslinking effect of triamines), whereby the lower values correspond to higher concentrations of these products. The polyamide-6,6 produced in accordance with the invention has a UV-transmission of at least 85%, preferably at least 88% after melt polycondensation, and of at least 70% after subsequent solid state polycondensation. These values are distinctly higher than those of commercial prior art products with, for example, 70% respective 40% after solid state polycondensation.

SPECIFIC EXAMPLES

EXAMPLE 1

A stirred 200 l autoclave-reactor with an external heating jacket and an internal heating coil through which Diphyl (eutectic mixture of biphenyl and diphenyl ether), a heat transfer medium from Bayer AG, was circulated, but without dephlegmator or rectification column, was flushed with nitrogen until oxygen-free (<3 ppm $O_2$) and preheated with Diphyl at 275° C. Then 88.0 kg of an 85.2% aqueous solution of adipic acid hexamethylene diamine salt containing 7.5 g $Na_2HPO_3 \cdot 5 H_2O$ and proheated to 175° C., were introduced into the reactor, while the Diphyl temperature was raised to 320° C. Within 10 minutes the reaction solution was heated to about 200° C. (heating rate 2.5° C./minute) and an autogenous pressure of 10 bar. As soon as the reaction pressure reached 10 bar, 19 l of water were evaporated within 34 minutes (evaporation rate 4.3%/minute). At the end of the precondensation phase the product temperature had risen to 255° C. Then within 20 minutes, the reactor pressure was reduced to atmospheric pressure and simultaneously the reaction product was heated to 280° C. After 16 more minutes at 280° C., the polyamide-6,6 had a relative viscosity of 2.59 and was pressed out of the reactor by a 6 bar nitrogen pressure and was pelletized under water. A total of 80 minutes lapsed from the point at which heating above 175° C. began. The product had a whiteness index (ASTM method E-313) of 81.1, a yellowness index (ASTM method D-1925) of 4.5, a UV-transmission (2 wt % polyamide in formic acid, 5cm cell) at 287 nm of 89.8% and a triamine content of less than 100 ppm (limit of detection), based on polyamide. The hexamethylene diamine content of the evaporated water was 0.81% by weight.

This polyamide-6,6 was spun at 4500 m/min. to filaments with a liter of 53 dtex, whereby no breaks occurred over 16 hours. At 40 to 41 cN/tex, the tenacity of the filaments was at the level of leading brand products. One part of the pelletized polyamide was polycondensed in the solid state at 175° C. in the presence of nitrogen. After 300 min., the relative viscosity was 3.7 and the UV-transmission at 287 nm 70.0%.

EXAMPLE 2

The method of example 1 was repeated with the following differences: The AH-salt solution contained, based on phosphorus, three times as much catalyst, i.e., 8.8 g $H_3PO_4$, 97%.

The heating of the solution from 175° C. to about 190° C. and 8 bar took 25 minutes at a heating rate of 0.6° C./minute. The evaporation of the water took 32 minutes at an evaporation rate of 4.6%/minute. The depressurization phase began at a product temperature of 245° C., and was completed at 0.6 bar pressure and 280° C. after 20 minutes. After three more minutes, or after a total of 80 minutes, the relative viscosity of the resulting polyamide-6,6 was 2.9. The whiteness index was 82.2, the yellowness index +3.7, the UV-transmission at 287 nm 90.2% and the triamine content less than 100 ppm (limit of detection). The hexamethylene diamine content of the water was 0.59% by weight. The tenacity of the filaments obtained through spinning was 45 to 50 cN/tex. Filament breaks did not occur during the 16 hour spinning process.

Comparative Example

The method of Example 1 was repeated with the following differences:

The AH-salt solution contained 23.0 g of triphenyl phosphate, instead of disodium phosphonate. The heating of the solution from 175° C. to approximately 200° C. and a pressure of 10 bar took 10 minutes and the subsequent evaporation of 19 l water 36 minutes. But the polycondensation until a relative viscosity of 2.55 required a three times longer residence time, i.e., 37 minutes. The total residence time from the point at which heating above 175° C. began amounts to 103 minutes, in comparison with 80 minutes by use of disodium phosphonate in accordance with the invention.

We claim:

1. A discontinuous catalytic process for the production of polyamide-6,6 with a relative viscosity of at least 2.2 (measured at 25° C. in a 1% polyamide solution in 96% sulfuric acid) comprising, adding to a 75% to 85% aqueous solution of adipic acid hexamethylene diamine salt (AH-salt) a compound forming $HPO_3^{2-}$-ions in a quantity corresponding to 0.001 to 0.008 wt % of phosphorus, based on solid AH-salt, heating said solution from 175° C. to a temperature above 175° C. at a rate in the range of 0.5 to 3.0° C./minute to autogenously attain precondensation pressure, precondensing said solution at a pressure in the range of 7 to 10 bar, as the temperature rises to a value in the range of 235° to 260° C. and simultaneously evaporating water from the solution at a rate of at least 2%/minute, whereby the percentages are based on the quantity of water in the AH salt solution, and polycondensing the precondensed product in the melt phase at a temperature between 260° and 290° C. while gradually reducing the pressure to 1 bar or less.

2. The process of claim 1 in which the polyamide-6,6 has a relative viscosity in the range of 2.2 to about 3.0 and in which the total residence time for heating from 175° C., for precondensing and for polycondensing being not more than 90 minutes.

3. The process of claim 2 in which the polyamide-6,6 has a UV-transmission of at least 85%, measured at 287nm on a 2 wt % polyamide solution in formic acid with a 5 cm cell.

4. The process of claim 1 in which the compound forming $HPO_3^{2-}$-ions is selected from phosphonic acid or alkaline metal phosphonates.

5. The process of claim 4 in which the compound forming $HPO_3^{2-}$-ions is $Na_2HPO_3 \cdot 5 H_2O$.

6. The process of claim 1 in which the rate of evaporation is at least 3%/minute.

7. The process of claim 1 in which the precondensation pressure is in the range of 8 to 9 bar.

8. The process of claim 1 in which after the polycondensation in the melt phase the polyamide-6,6 is pelletized, and the pellets are further polycondensed in the solid state at a temperature in the range of 165° to 190° C. under vacuum or in the presence of a current of an inactive gas.

* * * * *